(12) United States Patent
Gyllstrom (10) Patent No.: US 10,296,960 B1
(45) Date of Patent: May 21, 2019

(54) COLOR-BASED RECOMMENDATIONS USING PRODUCT IMAGES

(71) Applicant: Amazon Technologies, Inc., Seattle, WA (US)

(72) Inventor: Karl Anders Gyllstrom, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 844 days.

(21) Appl. No.: 14/716,779

(22) Filed: May 19, 2015

(51) Int. Cl.
| | |
|---|---|
| G06Q 30/00 | (2012.01) |
| G06Q 30/06 | (2012.01) |
| G06T 7/40 | (2017.01) |
| G06K 9/46 | (2006.01) |
| G06K 9/62 | (2006.01) |

(52) U.S. Cl.
CPC ....... *G06Q 30/0631* (2013.01); *G06K 9/4652* (2013.01); *G06K 9/6267* (2013.01); *G06T 7/408* (2013.01)

(58) Field of Classification Search
None
See application file for complete search history.

(56) References Cited

U.S. PATENT DOCUMENTS

| | | | | |
|---|---|---|---|---|
| 2001/0021914 A1* | 9/2001 | Jacobi | .................... | G06Q 30/02 705/14.53 |
| 2009/0021524 A1* | 1/2009 | Lenart-Weary | ......... | G01J 3/522 345/593 |
| 2011/0170770 A1* | 7/2011 | Remedios | ........... | G06F 17/3025 382/162 |
| 2013/0022264 A1* | 1/2013 | Atsmon | ................. | G06Q 10/00 382/165 |
| 2013/0083999 A1* | 4/2013 | Bhardwaj | .......... | G06O 30/0643 382/165 |
| 2014/0052584 A1* | 2/2014 | Gershon | ............ | G06O 30/0627 705/26.63 |
| 2014/0180864 A1* | 6/2014 | Orlov | ................. | G06Q 30/0631 705/26.7 |

OTHER PUBLICATIONS

Ali Jahanian; "Quantifying Aesthetics of Visual Design Applied to Automatic Design"; Dec. 8, 2014; Purdue University (Year: 2014).*

* cited by examiner

*Primary Examiner* — Jason B Dunham
*Assistant Examiner* — Norman Donald Sutch, Jr.
(74) *Attorney, Agent, or Firm* — Kilpatrick Townsend & Stockton LLP (57) ABSTRACT

Techniques described herein include a system and method for identifying color complements from an electronic marketplace catalog. In particular, the disclosure is directed to extracting color palette information from a variety of item images in the electronic catalog and creating clusters into which separate items are placed based on their similarity in colors. Multi-colored items may belong to more than one cluster (they may belong to a cluster for each color associated with the item). The clusters that share multi-colored items may be analyzed to determine the strength of a relationship between the two clusters. Clusters that share a significant number of items may be associated with complementary colors. In this disclosure, a service provider may receive a request related to an item, and may subsequently identify and recommend a complementary item.

19 Claims, 9 Drawing Sheets

COLOR-BASED RECOMMENDATIONS USING PRODUCT IMAGES

BACKGROUND

With a growing number of electronic retailers entering the field of electronic commerce, electronic retailers are finding it harder and harder to compete. In order to remain competitive, electronic retailers must do all that they can to attract customers and generate sales. Some electronic marketplaces attempt to do this by providing item recommendations to potential consumers. However, the relevancy of a particular item recommendation is often hard to gauge. This is especially true when it applies to the selection of clothing items to purchase or wear, as this is a difficult skill to master.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and method for identifying color complements and providing recommendations based on the identified color complements. In particular, the disclosure is directed to a system in which complementary colors are identified according to their co-occurrences in an item catalog.

By way of illustrative example, consider a scenario in which an electronic marketplace offers a plurality of clothing items. In this scenario, third party sellers, such as fashion designers, may provide some of the clothing items. Because a fashion designer may be considered an expert in clothing fashion, the provider of the electronic marketplace can assume that clothing produced by the fashion designer does not contain colors that clash. In other words, it may be assumed that multicolored clothing produced by a fashion designer includes only complementary colors. The service provider may take advantage of this assumption by generating color palettes from each item sold by a reputable fashion designer, clustering items by each of their color palettes, identifying those items that belong to more than one cluster, and noting the number of co-occurrences for particular color palette clusters. In this example, the service provider may determine that once a threshold number of co-occurrences has been met, the two color palette clusters are considered complementary. In this example, if a consumer selects a clothing item that has a complementary color, the service provider may recommend an accessory in that complementary color.

In accordance with at least some embodiments, a service provider may maintain an electronic catalog of items. One or more items in the electronic catalog may be clothing items offered either by the service provider or by third party sellers (merchants unrelated to the service provider). Either the service provider or the third party seller may provide images related to the items in the electronic catalog. In accordance with at least some embodiments, images of items within an electronic catalog may be analyzed in order to extract a color palette associated with each item. In at least some embodiments, images of items that are not offered by a service provider may be analyzed. For example, images in a fashion magazine may be analyzed to determine trending color palette information.

In accordance with at least some embodiments, color palette information may be analyzed in order to identify color complements, or colors that go well together. In at least some of these embodiments, color palette information related to items in an electronic catalog may be filtered according to a particular third party seller. In accordance with at least some embodiments, color palette information related to an item may be weighted or scaled according to a rating related to the item. For example, color palette information related to an item that is rated poorly may be discounted or not considered when identifying color complements. In at least some embodiments, color palette information may be weighted according to the item's popularity. For example, color palette information for an item with a high number of sales may be given more weight than color palette information for an item with a lower number of sales. In some cases, color palette information may be discounted for categories of items. For example, color palette information related to a sports memorabilia item may be disregarded.

In accordance with at least some embodiments, color complements may be seasonal or temporary in nature. For example, color palette information may be different for items sold in the winter than for items sold in the spring. Color palette information may be stored so that it is segregated by time period or season. In at least some embodiments, color complements may be specific to a particular third party seller or consumer.

In accordance with at least some embodiments, color complement data may be used to provide color-conscious recommendations to a consumer. For example, consider a scenario in which a consumer is purchasing, or has in the past purchased, a dress. Based on the colors found in the dress, a set of complementary colors may be identified.

These complementary colors may be maintained by the service provider as part of a color palette. Additional items may also be analyzed to identify other color complements, which may also be part of the color palette. In this scenario, the service provider may recommend an accessory that is offered in a color that is a complement to the dress based on the color of the dress and the color palette. For example, the service provider may present the consumer with a recommendation to purchase a purse, belt, or shoes in a color that goes well with the dress.

Figure 1:
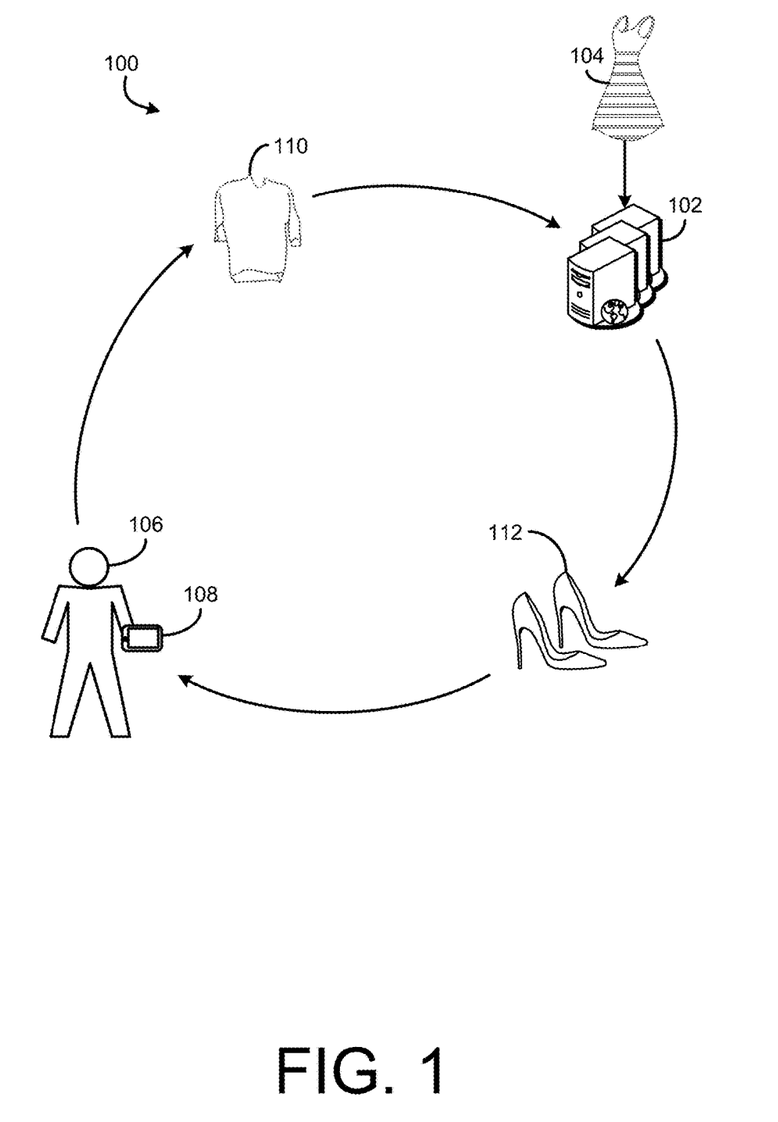
FIG. 1 depicts an illustrative example of a color-conscious recommendation system in accordance with at least one embodiment.

FIG. 1 depicts an illustrative example of a color-conscious recommendation system 100 in accordance with at least one embodiment. A service provider 102 may maintain an electronic marketplace with one or more items. Each of the one or more items may be associated with an item image 104, which may be analyzed in order to extract color palette information. In accordance with at least some embodiments, color palette information for a multitude of item images may be used to determine color complement data. In at least some of these embodiments, color complements may be ranked or given greater weight based on a number of factors. For example, color complement data may be given more weight for color combinations that occur more frequently, are associated with items that are higher rated, are associated with items from a more popular third party seller, or based on any other suitable factor.

In accordance with at least some embodiments, a user 106 may be in possession of a user device 108. The user 106 may initiate a purchase of one or more items 110 from the service provider 102 via the user device 108. In at least some of these embodiments, the service provider 102 may extract color palette information from item 110 in order to identify one or more complementary colors for the item 110. In at least some embodiments, the service provider may perform this analysis prior to receiving the purchase initiation from the user 106.

In accordance with at least some embodiments, a list of color complements may be identified by the service provider 102 for item 110. In at least some of these embodiments, the list of color complements may be ranked or ordered according to one or more criteria. Criteria may be associated with a particular user 106 via a user account with the service provider 102. For example, the user 106 may provide an indication that he or she does not like a particular color or color combination. In this example, colors corresponding to the disliked color may be filtered or removed from the color complement list. In accordance with at least some embodiments, a user's purchase history may be used to determine appropriate complementary colors. For example, the service provider may analyze item images associated with past purchase made by the user 106 in order to identify common color schemes and/or preferences for the user 106.

In accordance with at least some embodiments, the service provider 102 may use the determined color complement data to provide at least one item recommendation 112 to the user 106 via the user device 108. For example, the service provider may identify the top color complement candidates from the color complement information based on weights. The service provider may identify one or more items in the electronic catalog that are associated with the top color candidate from the color complement data and provide a recommendation for that item to the user 106. In some embodiments, the service provider may provide a recommendation for the item 110 in a different color to complement an item that was purchased in the past by the user 106.

Figure 2:
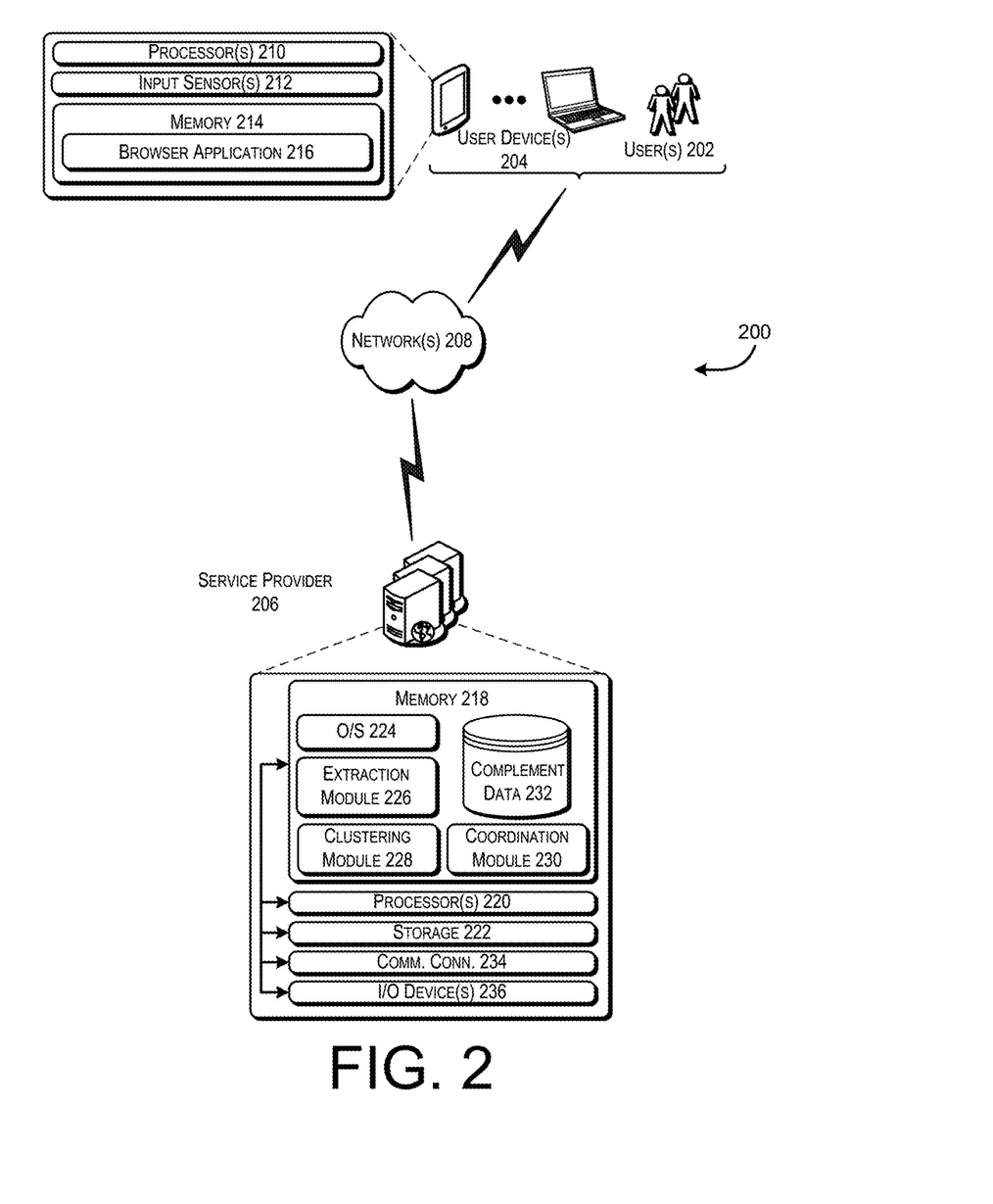
FIG. 2 depicts an illustrative example of a system or architecture in which techniques for identifying color complements and providing complementary recommendations may be implemented.

FIG. 2 depicts an illustrative example of a system or architecture 200 in which techniques for identifying color complements and providing complementary recommendations may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

In some examples, the network(s) 208 may include any one or a combination of many different types of networks, such as cable networks, the Internet, wireless networks, cellular networks, and other private and/or public networks. While the illustrated example represents the users 202 accessing the browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

Turning to the contents of the memory 214 in more detail, the memory 214 may include a browser application 216. The browser application 216 may allow the users 202 to interact with a service provider 206, such as to store, access, and/or manage data, develop and/or deploy computer applications, and/or host web content. The one or more subscription system(s) 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 218 and one or more processing units (or processor(s)) 220. The processor(s) 220 may be implemented as appropriate in hardware, computer-executable instructions, firmware or combinations thereof. Computer-executable instruction or firmware implementations of the processor(s) 220 may include computer-executable or machine executable instructions written in any suitable programming language to perform the various functions described.

The memory 218 may store program instructions that are loadable and executable on the processor(s) 220, as well as data generated during the execution of these programs. Depending on the configuration and type of service provider 206, the memory 218 may be volatile (such as random access memory (RAM)) and/or non-volatile (such as read-only memory (ROM), flash memory, etc.). The service provider 206 may also include additional storage 222, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM) or ROM. Turning to the contents of the memory 218 in more detail, the memory 218 may include an operating system 224 and one or more application programs or services for implementing the features disclosed herein including at least a module for extracting a color palette for an item image (extraction module 226), a module for grouping items according to color data (clustering module 228), and a module for providing a color-conscious recommendation (coordination module 230). The memory 218 may also include complement data 232, which provides item-related color data. In some embodiments, the complement data 232 may be stored in a database.

The memory 218 and the additional storage 222, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 234 that allow the service provider 206 to communicate with a stored database, another computing device or server, user terminals, and/or other devices on the network(s) 208. The service provider 206 may also include input/output (I/O) device(s) and/or ports 236, such as for enabling connection with a keyboard, a mouse, a pen, a voice input device, a touch input device, a display, speakers, a printer, etc.

Turning to the contents of the memory 218 in more detail, the memory 218 may include an operating system 224, a database containing complement data 232 and the one or more application programs or services for implementing the features disclosed herein, including a extraction module 226, a clustering module 228, and a coordination module 230.

In some embodiments, the extraction module 226 may be configured to extract color palette information from item images. In some embodiments, the extracted color palette information may then be stored with an association to the item. In accordance with at least some embodiments, extracted color palette information may be aggregated in order to identify complementary colors.

In some embodiments, the clustering module 228 may be configured to group items into similar clusters based on extracted color palette information. In accordance with at least some embodiments, a clustering algorithm may be used to identify k cluster points, where k is a number of cluster points. A cluster point is any point in space, to include a 2-dimensional or 3-dimensional space. In at least one embodiment, a cluster point may be defined by a set of coordinates in a three-parameter color space (i.e., a red-green-blue space). In accordance with at least some embodiments, a distance may be determined between extracted color palette information for an item and a cluster point. In at least some of these embodiments, the item may be associated with the cluster point to which is has the least distance.

In some embodiments, the coordination module 230 may be configured to identify complementary colors and provide appropriate recommendations. For example, the coordination module may identify co-occurrences of item clusters. For example, one or more items may each be associated with two separate color clusters. In this example, a high rate of co-occurrences for the two color clusters may indicate that the two colors are complementary. A consumer making a purchase of an item in the first color may be presented with a recommendation to purchase a second item in the complementary color.

Complement data 232 may be predetermined or it may be dynamically generated. For example, in at least some embodiments, the color complement data may be generated off-line, or in advance. In at least some of these embodiments, color complement data may be updated periodically, such as daily or hourly. In at least some of these embodiments, the color complement data may be generated for a new item as it is added to an electronic catalog. In accordance with at least some embodiments, a consumer may upload an image of an item, from which the service provider may extract color palette information and provide a recommendation. In at least some embodiments, item associations may be stored in complement data 232 for each cluster created by clustering module 228. In at least some of these embodiments, the associations may be recalculated when cluster data is changed (i.e., when k has updated and the number and positions of clusters has subsequently been updated).

Figure 3:
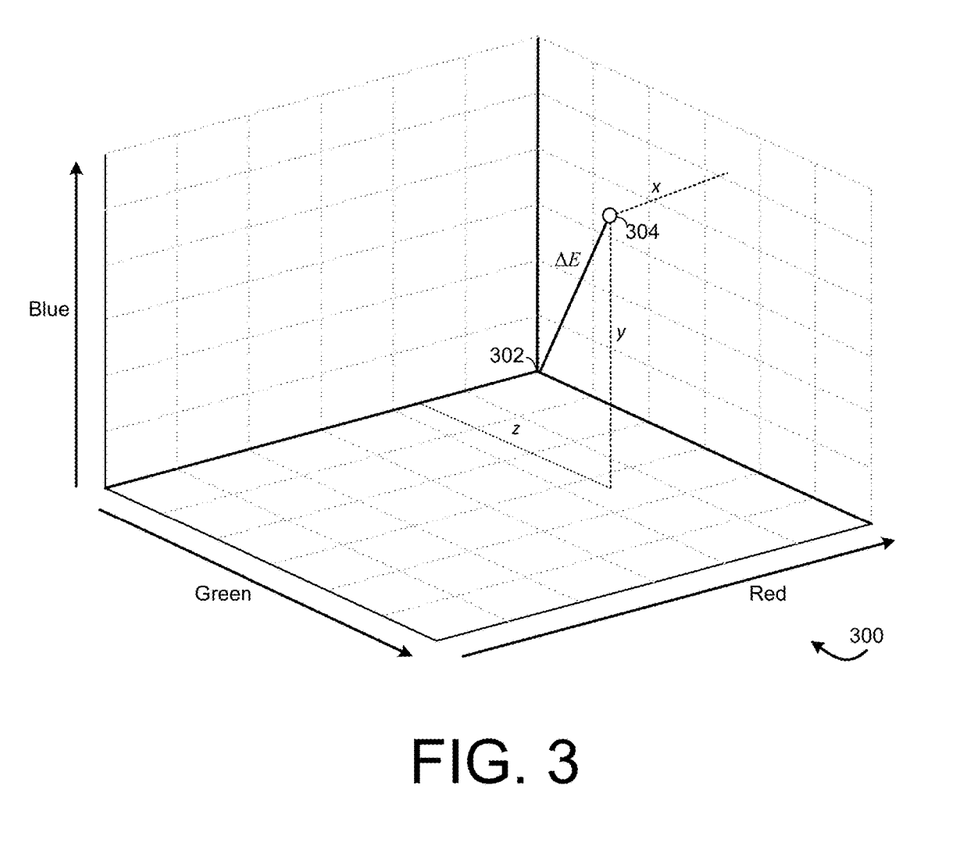
FIG. 3 depicts an illustrative example method of determining a difference, or distance between, two colors.

FIG. 3 depicts an illustrative example method of determining a difference, or distance between, two colors. In FIG. 3, a three dimensional graph 300 is depicted with the axes comprising red, green, and blue values. For example, color values may range in integer values from zero to 255 for each of red, green, and blue axes. This results in approximately 16,777,216 different colors. The distance between two colors is typically referred to as ΔE.

In accordance with at least some embodiments, the service provider may calculate the distance between two colors. For example, the service provider may calculate the ΔE for a first color at graph coordinates 302 and second color at graph coordinates 304. In this example, one skilled in the art would readily recognize that a difference in red values (represented by x), a difference in blue values (represented by y), and a difference in green values (represented by z) can be used to calculate ΔE. In a simple example, $$\Delta E = \sqrt{x^2 + y^2 + z^2}$$

Figure 4:
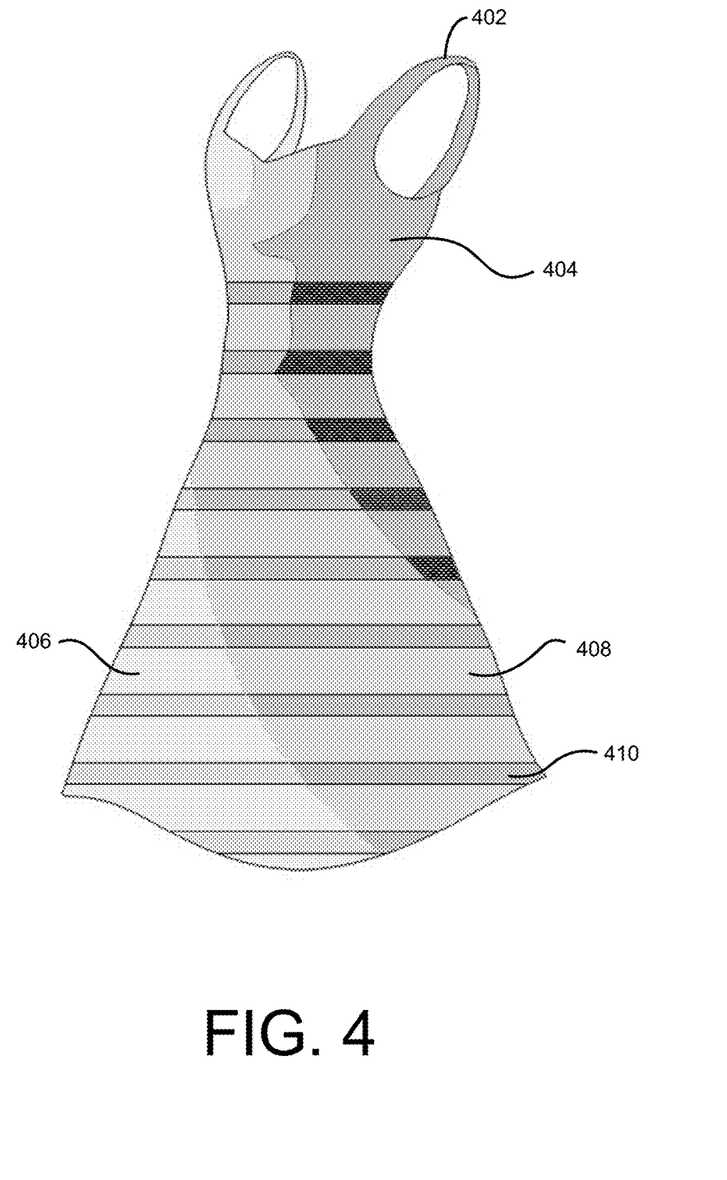
FIG. 4 depicts an example color palette extraction technique in accordance with at least one embodiment of the current disclosure.

In accordance with at least some embodiments, a ΔE may be calculated between a color located at coordinates 404 and each of a plurality of cluster values. In at least some of these embodiments, the cluster associated with the lowest ΔE for the color may be assigned to that color. Although a simple formula is presented, ΔE may be calculated using any distance calculation formula, including those developed to account for light, hue, and perceptual uniformity such as one of the formulae developed by the International Commission on Illumination (CIE). One skilled in the art would readily recognize that several equivalent techniques are available for calculating a distance between two colors. In at least some embodiments, tolerancing may be used to identify colors that are not easily distinguishable by the human eye, or have a ΔE below a just-noticeable-threshold value (JND). In at least some of these embodiments, common colors may be grouped based on tolerance. In some embodiments, the service provider may require that a complementary color be a minimum ΔE from another color in order to ensure that the colors are distinguishable. For example, two slightly different shades of red may be considered complementary under this technique. However, the service provider may elect not to present various shades of the same color. The service provider could prevent this by ensuring that the distance between the two colors exceeds a threshold value. Alternatively, the service provider may want to make a recommendation in the same (or in a shade that in unperceivably different) shade as another item. In this case, each item may be provided with a descriptive value (e.g., "red," "blue," "green," etc.) but this is often insufficient as a second item with the same descriptive value may be of a different shade. Instead, the service provider may cluster color groupings so that each color associated with the grouping is unperceivably different (below the JND). This enables the service provider to associate each item with a specific range of values in a particular color.

FIG. 4 depicts an example color palette extraction technique in accordance with at least one embodiment of the current disclosure. An extraction module, such as the extraction module 226 depicted in FIG. 2, may perform the example color palette extraction technique. Depicted in FIG. 4 is an image of a dress 402 having a shadowed region 404 and a lighted region 406. Additionally, the dress 402 in the image is multi-colored, in that it has a primary color 408 and a secondary color 410. A color palette is a list of color values and a portion of an image covered by each color value. In at least some embodiments of the current disclosure, a color of the color palette may need to be assigned red, green, and blue (RGB) values each from 0 to 255.

In accordance with at least some embodiments, the extraction module 226 may analyze an object image in order to determine (identify) a color palette for the item. For example, the extraction module may sample pixels to extract RGB values and determine a percentage of the image covered as a percentage of the pixels sampled. In some embodiments, colors may be ranked based on how much of the image they cover. In some embodiments, colors may be normalized to account for shadows and/or light areas. For example, the extraction module 226 may identify that the primary color 408 as occupying the majority of dress 402. The colors of the shadowed region 404 and the lighted region 406 may also be added to the color palette. In accordance with at least some embodiments, colors that have a ΔE below a threshold value may be considered the same color. For example, the extraction module may determine a threshold ΔE that may account for a difference in color caused by a shadow region 404 and/or a light region 406. In these embodiments, the colors of the shadow region 404 and the light region 406 may be grouped with the determined primary color 408.

In accordance with at least some embodiments, the extraction module may provide color palette information from the image of the dress 402 containing primary color 408 and an indication of a portion of the image covered by the primary color 408, and secondary color 410 and an indication of a portion of the image covered by the secondary color 410. In accordance with at least some embodiments, the dress 402 may be clustered according to each color in the extracted color palette. This is described in greater detail below.

Figure 5:
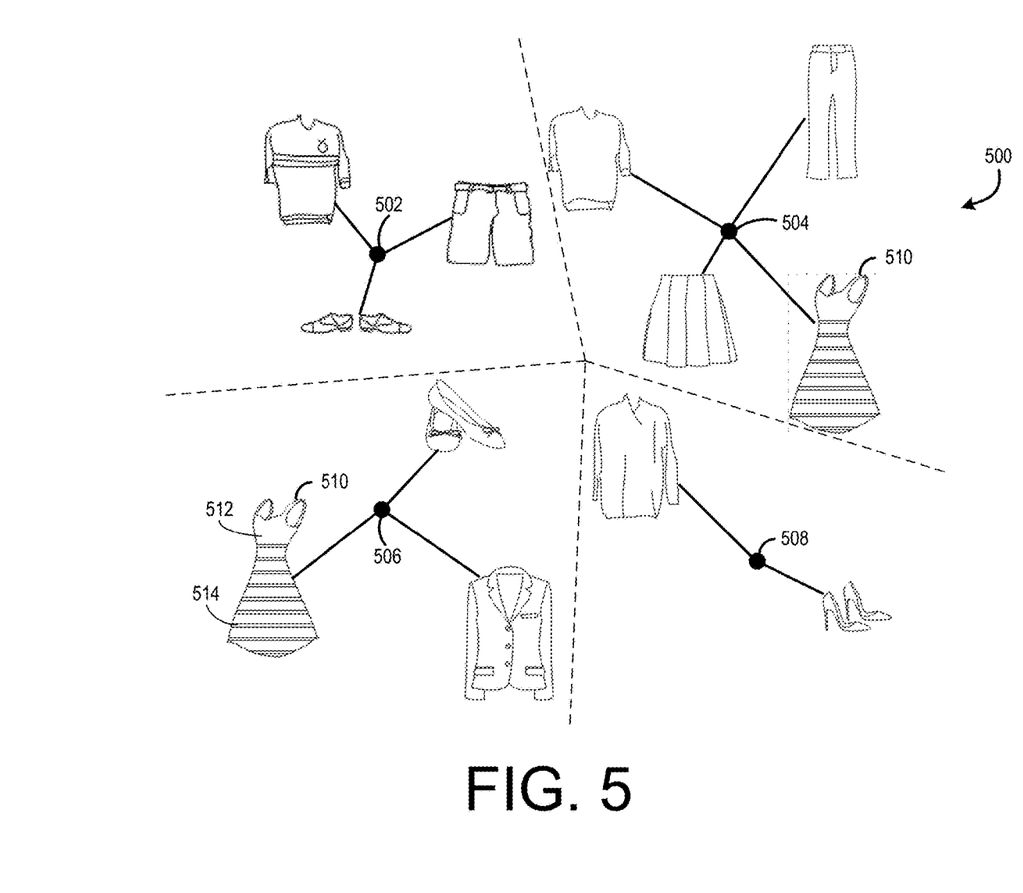
FIG. 5 depicts an illustrative example item cluster model created by a clustering module in accordance with at least one embodiment.

FIG. 5 depicts an illustrative example item cluster model 500 created by a clustering module in accordance with at least one embodiment. The clustering module may be an example of clustering module 228 depicted in FIG. 2. In item cluster model 500, several items are depicted as belonging to various cluster points (or centroids) 502, 504, 506, and 508. In accordance with at least some embodiments, cluster points 502, 504, 506, and 508 are sets of coordinates in an RGB color space. Each of the plurality of items is assigned to the cluster point with the lowest ΔE between the color space coordinates of the cluster point and color space coordinates of a color associated with the item.

In accordance with at least some embodiments, one or more items may be associated with more than one cluster. For example, a multi-colored item 510 may have at least a primary color 512 and a secondary color 514. In this example, multi-colored item 510 is depicted as having a striped pattern with primary color 512 comprising the majority of multi-colored item 510 and secondary color 514 comprising stripes on multi-colored item 510. However, a multi-colored item 510 may exhibit any number of patterns or graphic designs, as well as a variety of secondary colors. In item cluster model 500, multi-colored item 510 is depicted as belonging to two separate clusters. In this example, multi-colored item 510 may belong to cluster 504 by virtue of its primary color 512 as well as to cluster 506 by virtue of its secondary color 514.

In accordance with at least some embodiments, item cluster data from item cluster model 500 may be stored and/or maintained. For example, cluster data may be stored in complement data, which may be an example of complement data 232 of FIG. 2. In at least some embodiments, complement data may include information related to the item, such as an item identifier, item name, item category, percentage of cluster color associated with the item, or any other appropriate item-related information. In accordance with at least some embodiments, a list of items may be maintained in relation to each cluster.

Figure 6:
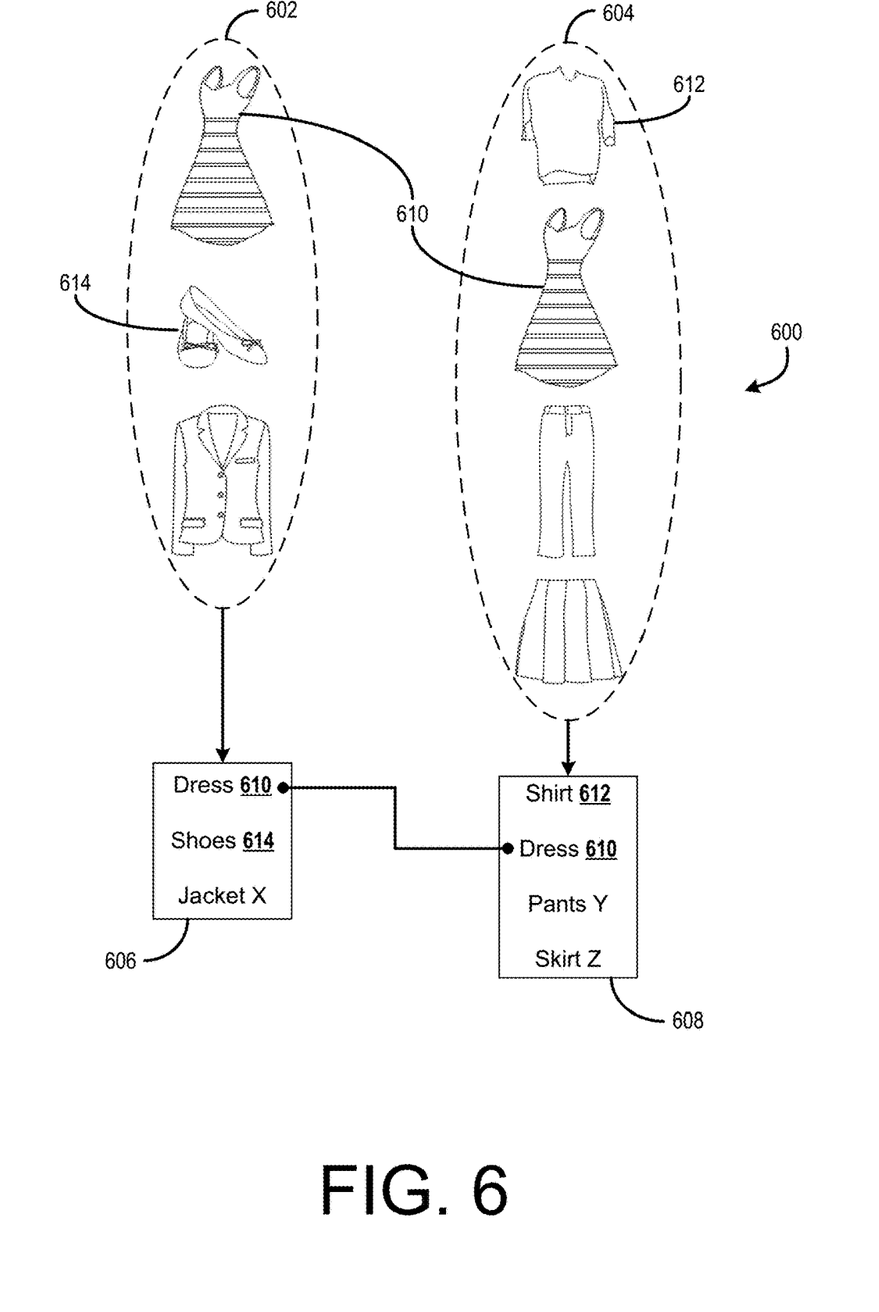
FIG. 6 depicts an illustrative example coordination and recommendation technique that may be performed in accordance with at least one embodiment.

FIG. 6 depicts an illustrative example coordination and recommendation technique 600 that may be performed in accordance with at least one embodiment. A coordination module, such as by the coordination module 230 depicted in FIG. 2, may perform the example coordination and recommendation technique 600. Once items have been clustered using one or more clustering techniques, cluster data for two or more item clusters 602 and 604 may be maintained as cluster data 606 and cluster data 608 respectively.

In accordance with at least some embodiments, one or more items 610 may be identified as belonging to multiple clusters. For example, item 610 in the illustrated example is depicted as belonging to both cluster data 606 and cluster data 608. In order to identify a complementary color set for cluster data 606, the service provider may identify a number of items 610 that also belong to one or more additional cluster data sets. In some embodiments, the service provider may, for each set of cluster data 606, determine a number of items 610 shared by other cluster data sets. In these embodiments, a color complement strength may be calculated based on the number of items shared by two clusters and may be used indicate the extent to which two clusters comprise complementary colors. In accordance with at least some embodiments, a color complement strength may be modified on one or more basis. For example, a color complement strength may be modified based on one or more ratings associated with a shared item, a category associated with a shared item, the percentage of a shared item covered by a color associated with each cluster, or any other suitable basis.

In accordance with at least some embodiments, for each cluster data set 606, a list of other cluster data sets may be associated with color complement strengths. In at least some of these embodiments, the other cluster data sets may be ranked according to their corresponding color complement strength. In accordance with at least some embodiments, a user may, via a user setting or filter, remove certain cluster data sets associated with colors that are undesirable to that user. In accordance with at least some embodiments, cluster data sets that are associated with neutral colors may be given greater or less weight.

In accordance with at least some embodiments, once a color complement is identified, a recommendation may be made. In accordance with at least some embodiments, when a purchase item 612 is selected, the service provider may determine that the purchase item 612 is associated with cluster data set 608. The service provider may then determine that cluster data set 606 has the highest color complement strength with relation to cluster data set 608, and a recommendation item 614 from item cluster data set 606 may subsequently be selected for recommendation. In accordance with at least one embodiment, a user's purchase history or rating history may be analyzed in order to identify a relevant recommendation. For example, if the user has purchased a pair of shoes in the past and/or given that pair of shoes a high rating, then the service provider may make a recommendation that includes that particular pair of shoes in a color that complements a current purchase. In accordance with at least some embodiments, a recommendation may be made regarding the current purchase item 612. For example, if the user has purchased an item in the past, the service provider may recommend that the user purchase item 612 in a color that complements the past purchased item instead of the currently selected color.

In accordance with at least some embodiments, color complement data may be stored in relation to a particular item category. For example, the service provider may separately maintain data set information for an item type or style. By way of illustration, a service provider may extract color palette information from each winter coat to identify color complement data specific to winter coats. Upon selection of a winter coat by a consumer, the color complement data may then be used to recommend a pair of winter boots to the consumer. In some embodiments, the color palette data may be used to identify counterfeit items. For example, the service provider may extract color palette information from a variety of sports memorabilia. In this example, an item that does not belong to multiple color groupings may actually be counterfeit (as the color does not actually match a team's true colors). The service provider may then flag these items for confirmation of authenticity. The service provider may maintain complementary color data as separate data sets. Some of these data sets may overlap. For example, a high fashion data set may share some items with, or encompass, a spring fashion data set. In at least some embodiments, the recommendation made by the service provider may be from the same data set.

In accordance with at least some embodiments, color complement data may be used in a number of additional ways. In at least some embodiments, when an electronic marketplace item is viewed on a webpage, the background of the webpage may be presented in a complementary color. Additionally, color complement recommendations are not limited to physical items. It is envisioned that color complement data may also be used to assess potential color combinations for digital goods. For example, a user may be presented with color recommendations for a network page or a website.

Figure 7:
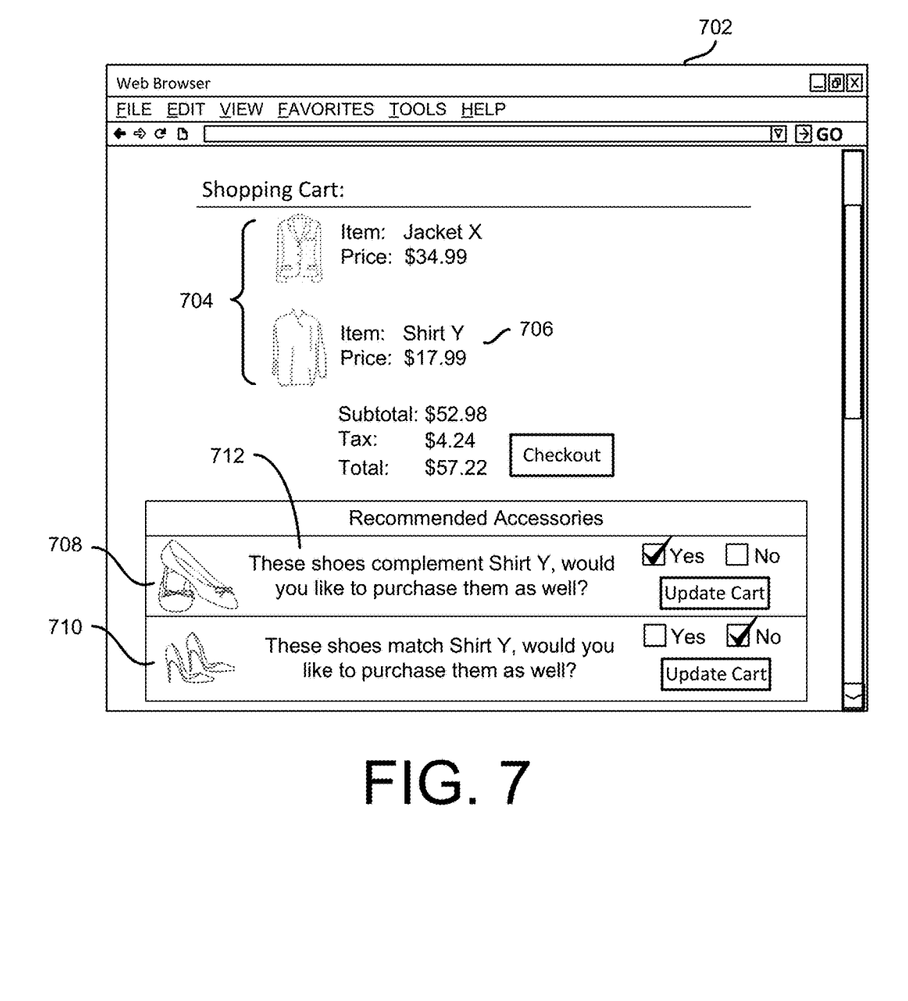
FIG. 7 depicts an illustrative example user interface for providing user interaction with the color complement system in accordance with at least one embodiment.

FIG. 7 depicts an illustrative example user interface for providing user interaction with the color complement system in accordance with at least one embodiment. In FIG. 7, a browser application 702 is depicted as providing access to an electronic marketplace maintained by a service provider. In accordance with at least one embodiment, a user may be required to log into an account in order to access an electronic marketplace or complete a purchase from the service provider.

In accordance with at least some embodiments, a user may select a list of items 704 for purchase. One or more items 706 from the list of items may be associated with color palette information (described elsewhere in the specification). In at least some of these embodiments, the color palette information may be used to determine a complementary item 708 or a matching item 710. For example, the service provider may provide a recommendation for an item 708 that is associated with color palette information that is determined to be a color complement of the color palette information associated with item 706. In another example, the service provider may provide a recommendation for an item 710 that is associated with the same color palette information that is associated with item 706. In at least some embodiments, a recommendation message 712 may be provided.

Figure 8:
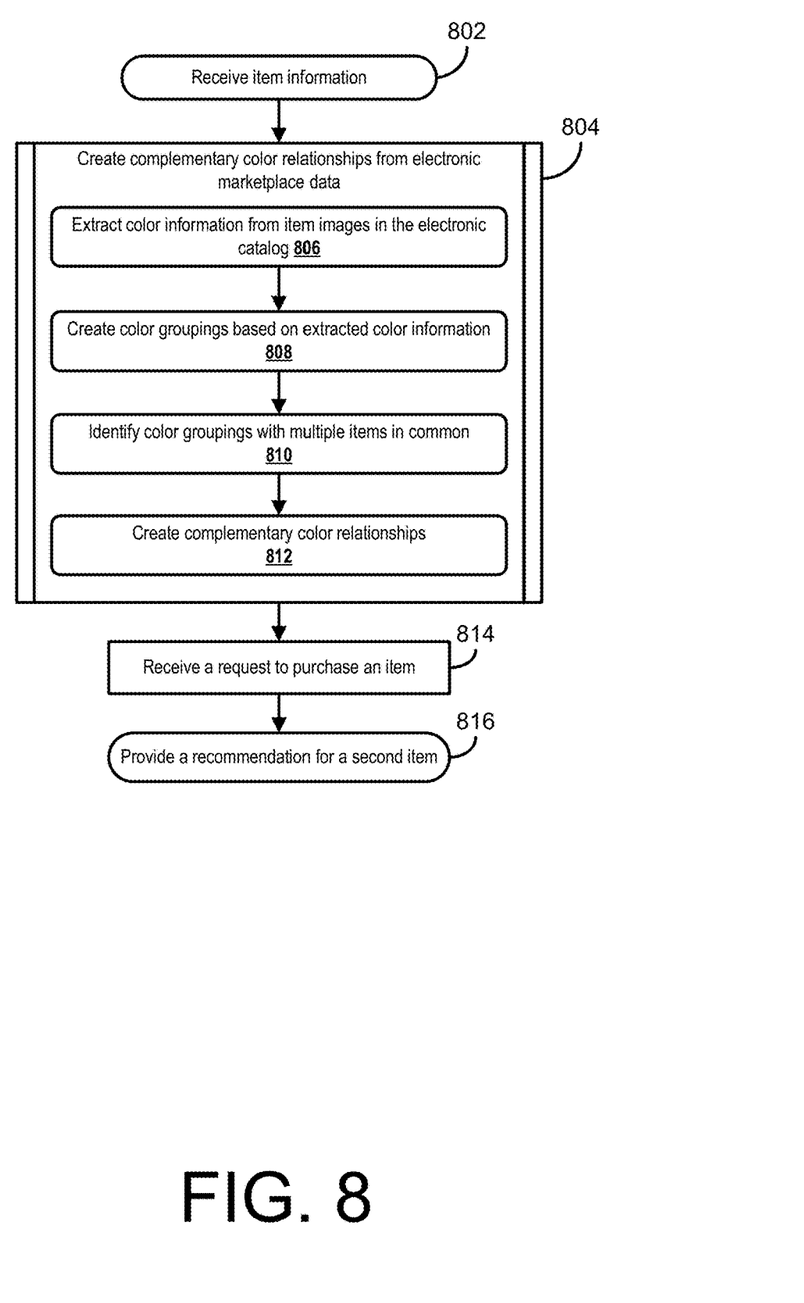
FIG. 8 depicts an illustrative flow diagram showing an example color extraction and recommendation process 800 in accordance with at least one embodiment.

FIG. 8 depicts an illustrative flow diagram showing an example color extraction and recommendation process 800 in accordance with at least one embodiment. Some or all of the process 800 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the process 800 of FIG. 8 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

The process 800 may begin at 802 when item information is received by a service provider. In accordance with at least some embodiments, the service provider may receive item information such as an item name, a description of the item, a digital image of the item, or any other suitable item-related information. In at least some embodiments, the item information may be received from a third party seller who wishes to sell the item in an electronic marketplace maintained by the service provider. Once information for a plurality of items has been received, it may be stored as an electronic catalog.

The service provider may implement process 800 in real time or it may perform parts of process 800 periodically. For example, the service provider may use a subprocess 804 to extract color values from item information and create complementary color relationships. In at least some embodiments, items subjected to subprocess 804 may be filtered according to an item classification or a third party associated with the item. For example, sports memorabilia are often associated with team colors, which are not necessarily complementary colors. For that reason, it may be advantageous not to include sports memorabilia in color complement data. Alternatively, a separate data set may be maintained for sport memorabilia. By way of a second example, the service provider may wish to limit subprocess 804 to only those items sold by reputable clothing designers, or fashion experts, in order to prevent items having clashing colors from being analyzed.

Subprocess 804 may be broken up into multiple steps. First, subprocess 804 may extract color information from item images stored in association to the electronic catalog at 806. For example, the service provider may use color sampling to extract a color palette for each item in the electronic catalog. In at least some embodiments, color palette information for an item may be provided along with the item information. For example, the third party seller of the item may provide information related to the item's color palette. Once color palette information is obtained for multiple items, the service provider may create clusters or groupings associated with various color palettes at 808. One skilled in the art would recognize that a variety of clustering algorithms are available and may be used to segregate various color palettes. Some items, such as multi-colored items, may be put into two or more clusters (a cluster for each color in the color palette). For each combination of two clusters, the service provider may determine the number of items shared by those clusters at 810. Based on the number of items each set of two clusters has in common, the service provider may assign a complementary color strength to that set of two clusters. If the complementary strength rises above a threshold amount, then the service provider may determine that the two color clusters represent complementary colors at 812. The service provider may store an indication of this relationship. Once subprocess 804 has been completed, the results may be stored in a storage medium. For example, color palette data and complementary color relationships may be stored in database tables, such as via a relational database management system. As pointed out earlier in this disclosure, subprocess 804 may be performed upon the creation of the electronic catalog, periodically, or as new item information is received.

In process 800, the service provider may receive a request related to an item at 814. The request may be a request to view the item, purchase the item, compare the item to another item, or perform any other action with regard to the item. The request may contain item-related information. In at least some embodiments, the service provider may use object recognition to determine the type of object depicted in the item-related information. It should be appreciated that a variety of methods are known and available for enabling object recognition. It is intended that this disclosure encompass any suitable pattern recognition or digital geometry analysis technique known to one skilled in the art. For example, digital geometry analysis involves creating a discrete set of points from an object, such as a skeleton, while maintaining the digital topology (important topological properties such as boundaries, connectedness, or color patterns) of the object. In this method, the discrete data set for the object can be compared to known discrete data sets in order to determine a match and identify the object. By way of further example, pattern recognition techniques may include techniques such as sequence labeling, which assigns a class to each member of a sequence of values. In this technique, a labeled data set is created using the algorithmic assignment of a categorical label to each member of a sequence of observed values. In addition, object recognition techniques are available for analyzing stored data as well as real-time data. In at least some embodiments, the service provider may identify color palette information related to the item in question and determine an appropriate color grouping for that item. Once an appropriate color grouping has been identified, a complementary color grouping may be determined from the stored complementary color relationships. The service provider may then provide a recommendation for at least one item that is available in the complementary color to the requestor.

For example, in at least some embodiments, a user may submit a picture of an item that the user already owns. In this example, the service provider may extract color palette information from the submitted picture, determine an appropriate color group for the item, and subsequently identify a color complement for the determined color group. The service provider may identify one or more items that are associated with the complementary color. In at least some embodiments of this example, the service provider may use object recognition to determine the type of object depicted in the image. In some embodiments, the service provider may identify accessory items, or items that are designed to visually enhance a primary item. In some embodiments, the service provider may determine that the object depicted is an accessory item and may provide a recommendation for a different type of accessory item or a primary item.

Figure 9:
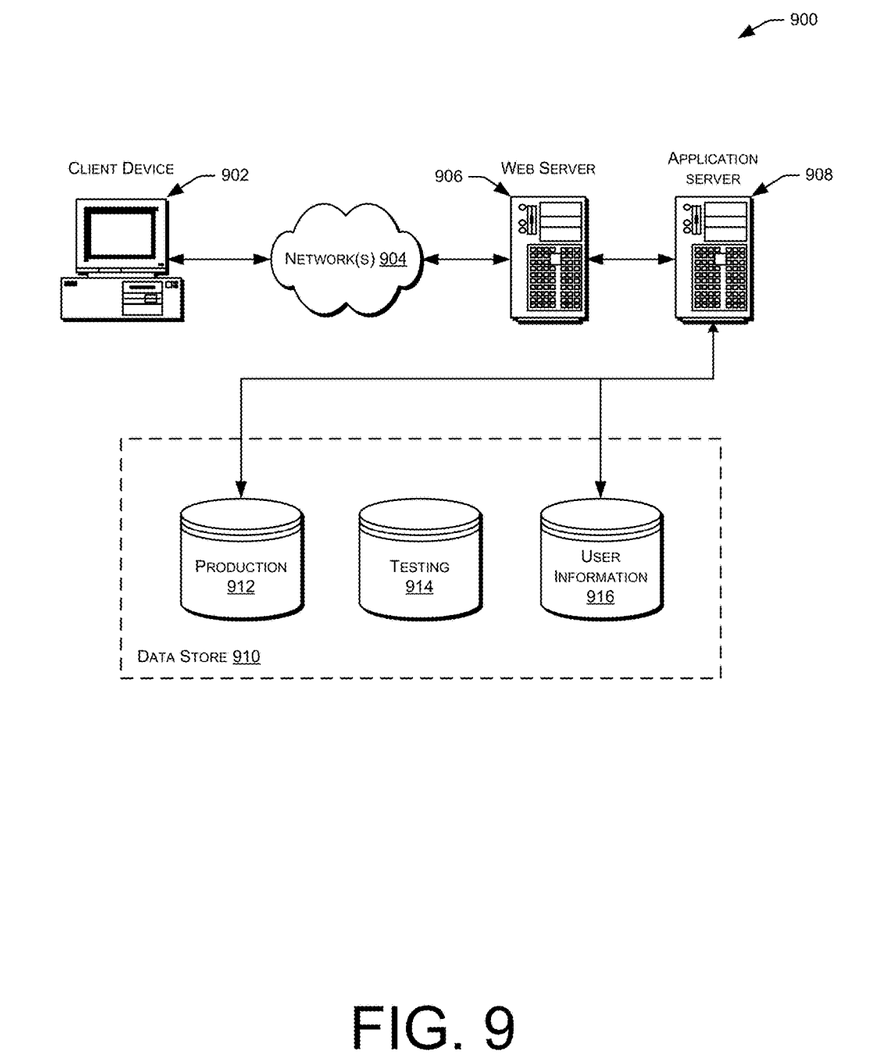
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
maintaining, in a catalog of an electronic marketplace, image information related to a plurality of clothing items;
identifying, from the image information related to the plurality of clothing items, color information of the plurality of clothing items by color sampling pixels within the image information such that the color information is determined as a percentage of the pixels sampled;
generating, based at least in part on the identified color information, a plurality of color groupings to which the plurality of clothing items are associated;
identifying, from the plurality of clothing items, a number of clothing items each associated with at least two color groupings of the plurality of color groupings;
identifying, based at least in part on the on the number of clothing items being greater than a threshold value, a complementary relationship between the at least two color groupings;
receiving a request related to a first item of the plurality of clothing items;
determining that the first item is associated with a first color grouping of the at least two color groupings;
identifying a number of second items associated with a second color grouping of the at least two color groupings;
determining, based at least in part on the complementary relationship between the at least two color groupings, that a second item of the number of second items is a complementary item; and
presenting a recommendation related to the second item.

2. The computer-implemented method of claim 1, wherein the color information is identified from the image information by extracting color values in a color space from an image using machine vision.

3. The computer-implemented method of claim 1, wherein the image information is received from a third party associated with an item of the plurality of items.

4. The computer-implemented method of claim 1, wherein an item of the plurality of items is associated with a color grouping of the plurality of color groupings based at least in part on a similarity between the color grouping and the color information for the item.

5. A system, comprising:
a processor; and
a memory including instructions that, when executed with the processor, cause the system to, at least:
identify, from image information related to a plurality of clothing items, color information of the plurality of clothing items by color sampling pixels within the image information;
associate individual clothing items of the plurality of clothing items with one or more color groups based on the color information;
upon determining that a number of the same individual clothing items are associated with two color groups, create a complementary relationship between the two color groups;
receive information related to a first item, the information including color data;
determine, based at least in part on color data, that the item is to be assigned to a first color group of the two color groups;
identify one or more second items associated with a second color group of the two color groups; and
provide a recommendation for the one or more second items.

6. The system of claim 5, wherein the information related to the first item includes a digital image of the item.

7. The system of claim 5, wherein the first color group for the first item to be assigned is determined based at least in part on a distance between a cluster point of the first color group and at least one color of the color data included in the information related to the first item.

8. The system of claim 5, wherein the complementary relationship is created based at least in part on an number of the same individual clothing items shared by the second color group and the first color group exceeding a threshold value.

9. The system of claim 5, wherein the complementary relationship is created based at least in part on an item rating, a category associated with at least one shared item, or a percentage of the at least one shared item that corresponds to the first color group.

10. The system of claim 5, wherein the one or more second items associated with the second color group includes at least one item is worn with the first item.

11. The system of claim 5, wherein the recommendation is presented within a user interface as a notification message that includes an option to order the one or more second items.

12. The system of claim 5, further comprising instructions that cause the system to, at least provide a second recommendation for a third item, the third item being associated with the first color group.

13. A non-transitory computer readable storage medium storing computer-executable instructions that, when executed by a processor, cause a computer system to at least perform operations comprising:
identifying, from image information related to a plurality of clothing items, color information of the plurality of clothing items by color sampling pixels within the image information;
associating individual clothing items of the plurality of clothing items with one or more color groupings based on the color information;
upon determining that two color groupings are associated with a number of the same individual clothing items, identifying a complementary relationship between the two color groupings;
receiving a request related to a first item;
determining the first item is associated with a first color grouping of the two color groupings;
identifying a second item based at least in part on the second item being associated with a second color grouping of the two color groupings; and
providing a recommendation for the second item.

14. The computer readable storage medium of claim 13, wherein the request related to the first item is the request to order the first item.

15. The computer readable storage medium of claim 13, wherein the second item is further identified based at least in part on the second item corresponding to a purchase history.

16. The computer readable storage medium of claim 13, wherein the received request includes an image, and the determined color associated with the first item is identified from the image.

17. The computer readable storage medium of claim 16, wherein the first item is identified from the image based at least in part on an object recognition process.

18. The computer readable storage medium of claim 13, wherein the plurality of clothing items includes at least a multi-colored clothing item received from a third-party.

19. The computer readable storage medium of claim 13, wherein the first color grouping and the second color grouping are a minimum distance apart.

* * * * *